Aug. 19, 1969 L. W. WIGHTMAN 3,462,164
SNAP RING DRILL CHUCK ASSEMBLY
Filed July 14, 1967
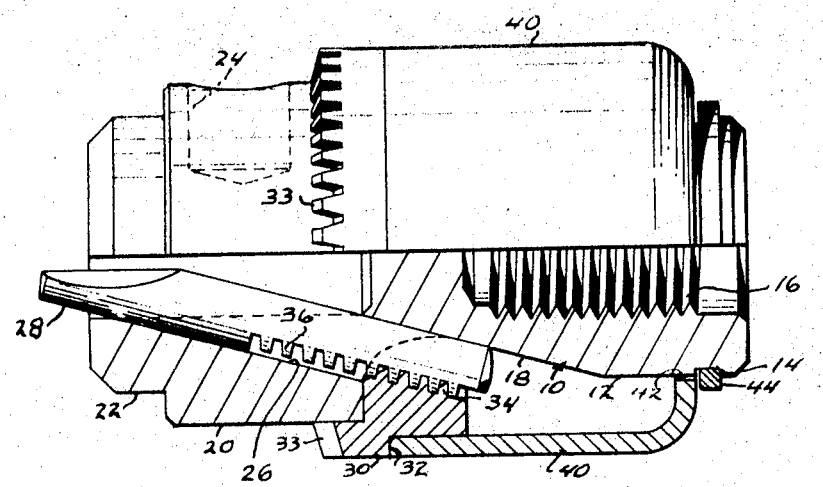
INVENTOR.
Lawrance W. Wightman
BY J. O. Douglas
his atty 3,462,164
Patented Aug. 19, 1969

3,462,164
SNAP RING DRILL CHUCK ASSEMBLY
Lawrance W. Wightman, St. Louis, Mo., assignor to Emerson Electric Co., St. Louis, Mo., a corporation of Missouri
Filed July 14, 1967, Ser. No. 653,445
Int. Cl. B23b 31/12, 5/22, 5/34
U.S. Cl. 279—62                                  3 Claims

ABSTRACT OF THE DISCLOSURE

A chuck body has the usual jaw guiding means and key operated gear nut which engages with and advances the jaws in a path at an angle to the body in work gripping engagement with a workpiece. The base end of the body is reduced in size and a cup-shaped housing of metal secured to a gear nut. The housing has an apertured end disposed in rotational engagement with the base of the body and held in position by a retainer on the base of the body beyond the cup.

---

As well known to those versed in the art there are small key operated universal chucks which are in extensive use one portable electric power drills and light duty machinery. Because the price range of these tools is highly competitive it becomes necessary to reduce the cost of the chucks as much as possible without causing a deterioration in quality.

Heretofore such chucks have usually consisted of a body, one end of which is provided with means to enable it to be attached to the driving means and the other end having slanting ways for supporting and guiding a set of jaws. Gear nut means is provided having threads on the inner side for engagement with threads on the sides of the jaws and a bevel gear on the outer end for engagement with a key to rotate the same. The gear nut is usually split so that it can be engaged in a groove on the body and a housing telescoped over the body and around a seat on the gear means to hold the chuck parts assembled.

Obviously the wear is largely on the body, gear means and chuck jaws, therefore they must be made of good quality material. All of the parts must be machined to a high degree of accuracy to provide for smooth, efficient and long wearing operation.

By the present invention the weight and size of the body may be reduced, resulting in a reduction in the total weight. In addition, the character of the body is such that machining operations are greatly simplified. Further, reduction in cost and weight are realized by making the outer sleeve or housing in the form of a cup which may be pressed metal, powdered steel or other material.

Still other advantages of the invention and the invention itself will become more apparent from the following description of an embodiment thereof which is illustrated by the accompanying drawing and forms a part of this specification.

In the drawing:

The figure is a view partly in elevation and partly in horizontal section of a chuck of the invention.

Referring to the drawing, the chuck comprises a body 10, the base 12 of which is cylindrical and is provided with a groove 14 spaced slightly from the end. Previously this end was provided with an outwardly extending heavy flange, as shown in Patent No. 3,044,790, which has been eliminated. The base of the body is axially threaded at 16 to enable it to be attached to a threaded arbor or spindle. Obviously this could be a tapered hole for use with a tapered arbor or have an outwardly extending shank.

The outer surface of the body, proceeding to the left, is tapered inwardly at 18, to provide a frusto-conical surface the angularity thereof being the same as the angle of the jaws and which may be 15° to the axis of the body. It then curves outwardly, as shown by the dotted lines, and meets with an enlarged cylindrical body 20, to provide a cylindrical jaw holding portion, and terminates at the end in a reduced part 22. A plurality of blind holes 24 are formed in the part 20 for receiving the pilot end of a chuck key, as well known in the art. The part 20 is drilled at 26 to provide three ways in which chuck jaws 28 are slidably disposed. Heretofore the body had been provided with an enlarged intermediate thrust absorbing flange, as shown in said patent. That flange is also eliminated. The elimination of the two enlarged flanges the one at the base and the other intermediate the base flange and the part 20, simplifies the drilling of the jaws which do not need to go through the intermediate flange, and thus enables the ways to be drilled from the base end of the body.

Prior to this invention, a machined sleeve, generally of the character shown in said patent, was used. The sleeve must rotate on the chuck body and therefore it was held in place by a press fit between the sleeve and the gear.

It will be appreciated that the prior art sleeve had to be made with precision because it was assembled with the gear with a press fit and the gear, in turn, must have a close but slidable fit with the head such as 20, and the sleeve also must have a sliding fit with the base flange of the body. It is the rotation of the gear nut relative to the body that operates the jaws. The engagement with the inner or nut part of the gear with the median flange of the body, which flange has been eliminated in this invention, was the means for holding the parts assembled and absorbing the thrust when the gear nut was rotated to tighten the jaws.

The present invention includes a ring gear and nut means which is formed to provide a shoulder 32, and opposite the shoulder bevel teeth 33 for cooperation with the pinion on a key chuck, as is well known. The inner surface of the gear is formed with threads or teeth 34 which match with the threads or teeth 36 on the chuck jaws. Rotation of the gear nut advances and retracts the chuck jaws.

The usual machined sleeve has been eliminated and, in place thereof, there is provided a cup-shaped housing 40, the one end of which may have a press fit with the gear nut and abutting the shoulder 32 thereon. Although a press fit is preferred, since it holds the gear nut parts assembled, it could be joined with the gear nut by a relatively loose fit or secured thereto by one of the epoxy resins. The other end of the housing is provided with an end wall having an opening 42 providing a close but free fit with the body 12 which extends through the opening. The cup sleeve and ring gear are held in position by a retainer ring 44 disposed in the groove 14 on the body 12. Other means could be provided, if desired, for holding the cup on the body.

It is apparent that when the sleeve 40 is made from a stamping a minimum or no machining is required and it can be made of relatively cheap metal, thus resulting in a considerable reduction in costs. It may also be made of powdered steel, forged or in many other ways. The important thing being that by its design it can be made considerably cheaper.

The new structure provides an improved mode of operation. When the jaws are advanced to grip an object, by rotating the gear 30, the thrust of the gear, which is forcing the jaws to the left as viewed in the figure, is to the right and against the housing 40 which in turn engages the ring 44 in the chuck body. The pressure on the jaws, where they grip the object is radially outward and this is absorbed by the head 20. The part 18 acts as an inward thrust receiving surface for the parts of the jaws that may be to the right of the gear 30 as well as a guiding surface.

Having thus described the invention in an embodiment thereof, it is appreciated that numerous and extensive departures may be from the disclosure without departing from the spirit or scope thereof as defined by the appended claims.

I claim:

1. A chuck comprising a body having an enlarged cylindrical end portion formed with ways extending at an angle to the axis thereof and chuck jaws slidably disposed therein, said body adjacent to and inwardly of the enlarged end being of smaller diameter and gradually increasing in diameter and terminating at the opposite end to the enlarged end in a second cylindrical portion, gear means mounted on said first cylindrical portion and engaging with said chuck jaws, a housing for enclosing said body portion beyond said enlarged end comprising a member having a cylindrical portion surrounding the body and a portion of said gear means and having an end wall formed to provide an aperture therein coaxial with the body and said last cylindrical end of the body extending through the aperture and retainer means on said second cylindrical end beyond said end wall for holding said housing on the body.

2. A chuck as described in claim 1, wherein said retainer means includes a ring disposed in a groove on the body and extending opposite said end wall arranged to engage with the end wall.

3. A chuck as described in claim 2, wherein the body between said cylindrical ends defines a wall that slants at the same angle as said ways and provides a support for the jaws beyond said ways.

References Cited

UNITED STATES PATENTS 1,476,903   12/1923   McConnell _____ 279—62

FOREIGN PATENTS 414,941   9/1946   Italy.

LESTER M. SWINGLE, Primary Examiner